United States Patent
Kunou (10) Patent No.: US 8,520,112 B2
(45) Date of Patent: Aug. 27, 2013

(54) IMAGING DEVICE, DISPLAY CONTROL METHOD, AND PROGRAM

(75) Inventor: Katsutoshi Kunou, Saitama (JP)

(73) Assignee: Sony Corporation, Tokyo (JP)

( * ) Notice: Subject to any disclaimer, the term of this patent is extended or adjusted under 35 U.S.C. 154(b) by 441 days.

(21) Appl. No.: 11/908,341

(22) PCT Filed: Jan. 30, 2007

(86) PCT No.: PCT/JP2007/051426
§ 371 (c)(1),
(2), (4) Date: Sep. 11, 2007

(87) PCT Pub. No.: WO2007/086571
PCT Pub. Date: Aug. 2, 2007

(65) Prior Publication Data
US 2009/0027539 A1    Jan. 29, 2009

(30) Foreign Application Priority Data

Jan. 30, 2006 (JP) ................................. 2006-020609

(51) Int. Cl.
*H04N 5/222* (2006.01)
(52) U.S. Cl.
USPC ............. 348/333.01; 348/333.02; 348/333.04
(58) Field of Classification Search
USPC ....................................... 348/333.01–333.02
See application file for complete search history.

(56) References Cited

U.S. PATENT DOCUMENTS

| | | | |
|---|---|---|---|
| 6,118,480 A | 9/2000 | Anderson et al. | |
| 6,458,081 B1 * | 10/2002 | Matsui et al. | 600/437 |
| 6,680,749 B1 | 1/2004 | Anderson et al. | |
| 7,506,256 B2 * | 3/2009 | Baker et al. | 715/708 |
| 7,515,190 B2 * | 4/2009 | Kobayashi et al. | 348/333.01 |
| 7,551,218 B2 * | 6/2009 | Sasagawa et al. | 348/333.04 |
| 7,561,201 B2 * | 7/2009 | Hong | 348/333.01 |
| 7,603,182 B2 * | 10/2009 | Sano et al. | 700/15 |

(Continued)

FOREIGN PATENT DOCUMENTS

| | | |
|---|---|---|
| CN | 1677988 A | 10/2005 |
| JP | 4 281438 | 10/1992 |

(Continued)

OTHER PUBLICATIONS

Office Action issued Nov. 2, 2010 in JP Application No. 2006-020609.

(Continued)

*Primary Examiner* — Roberto Velez
*Assistant Examiner* — Pritham Prabhakher
(74) *Attorney, Agent, or Firm* — Oblon, Spivak, McClelland, Maier & Neustadt, L.L.P.

(57) ABSTRACT

An image capturing apparatus including: a user input, which when operated causes a menu to be displayed; and display control means for displaying the menu upon press of the user input, the menu listing images representing all selectable set values in the order of being able to be selected by each press of the user input, and changing a highlighted one of the images by changing display positions of all the images listed in the menu every time the user input is pressed, wherein the display control means further displays an arrow between each of the images listed in the menu, each arrow indicating an order of being highlighted by each press of the user input between the images listed in the menu.

11 Claims, 7 Drawing Sheets

(56) References Cited

U.S. PATENT DOCUMENTS

| | | | |
|---|---|---|---|
| 2002/0033848 A1* | 3/2002 | Sciammarella et al. | 345/838 |
| 2006/0103751 A1* | 5/2006 | Lee | 348/333.02 |
| 2006/0146165 A1* | 7/2006 | Hagiwara et al. | 348/333.01 |

FOREIGN PATENT DOCUMENTS

| | | |
|---|---|---|
| JP | 11 196297 | 7/1999 |
| JP | 2000-283782 | 10/2000 |
| JP | 2002-281352 | 9/2002 |
| JP | 2002-344777 | 11/2002 |
| JP | 2004-029423 | 1/2004 |
| JP | 2004-80351 | 3/2004 |
| JP | 2004-110097 | 4/2004 |
| JP | 2004-295159 | 10/2004 |
| JP | 2004-326189 | 11/2004 |
| JP | 2004 363707 | 12/2004 |
| JP | 2004-363707 | 12/2004 |
| JP | 2005-221771 | 8/2005 |
| JP | 2005-244907 | 9/2005 |
| JP | 2005-269243 A | 9/2005 |
| JP | 2005-303609 | 10/2005 |
| JP | 2005-311878 | 11/2005 |
| WO | WO 98/51073 A1 | 11/1998 |
| WO | WO 03/062976 A1 | 7/2003 |

OTHER PUBLICATIONS

Extended Supplementary European Search Report issued on Apr. 20, 2011 in corresponding European Application No. 07 70 7657.

Office Action issued Jul. 19, 2011, in Japanese Patent Application No. 2006-020609.

Office Action issued Sep. 22, 2011 in Japan Application No. 2006-020609.

* cited by examiner

IMAGING DEVICE, DISPLAY CONTROL METHOD, AND PROGRAM

TECHNICAL FIELD

The present invention relates to an image capturing apparatus, a display control method, and a program. Particularly, the present invention relates to an image capturing apparatus, a display control method, and a program enabling a user to intuitively understand all set values selectable as setting about shooting and an operation to select a desired set value.

BACKGROUND ART

Conventionally, various techniques to display setting information of apparatuses including digital cameras in a more user-friendly manner have been suggested.

For example, Patent Document 1 discloses a technique of displaying icons representing setting information of an apparatus on a screen, and displaying the icons by enlarging them or displaying a set value indicating setting by characters as necessary.

[Patent Document 1] Japanese Unexamined Patent Application Publication No. 4-281438

DISCLOSURE OF INVENTION

Problems to be Solved by the Invention

In the conventional apparatuses including digital cameras, various settings can be changed by pressing a button (toggle button) provided on a surface of the apparatus in a hardware manner. In many cases, however, the user can know set values that can be set only after actually pressing the button several times.

Furthermore, it is difficult for the user to know a method for operating the button to set a desired value, e.g., how many times the user needs to press the button.

The present invention has been made in view of these circumstances, and is directed to enabling the user to intuitively understand all set values selectable as setting about shooting and an operation to select a desired set value.

Means for Solving the Problems

An image capturing apparatus according to an aspect of the present invention is an image capturing apparatus provided with a button operated to perform setting about shooting. The image capturing apparatus includes display control means for displaying a menu upon press of the button, the menu listing images representing all selectable set values in the order of being able to be selected by each press of the button, and changing a highlighted one of the images by changing display positions of all the images listed in the menu every time the button is pressed.

The display control means may further display an explanation of the set value represented by the highlighted image in the form of sentence on the menu.

The display control means may display the sentence serving as the explanation of the set value after predetermined time has elapsed from a press of the button.

The display control means may further display an arrow indicating the order of being highlighted by each press of the button between the listed images.

The display control means may further display different images as images representing selectable set values on the menu in accordance with a mode selected by a user.

A display control method according to an aspect of the present invention is a display control method of an image capturing apparatus provided with a button capable of changing setting about shooting. The display control method includes a step of displaying a menu upon press of the button, the menu listing images representing all selectable set values in the order of being able to be selected by each press of the button, and changing a highlighted one of the images by changing display positions of all the images listed in the menu every time the button is pressed.

A program according to an aspect of the present invention is a program allowing a computer to execute a display control process of an image capturing apparatus provided with a button capable of changing setting about shooting. The program includes a step of displaying a menu upon press of the button, the menu listing images representing all selectable set values in the order of being able to be selected by each press of the button, and changing a highlighted one of the images by changing display positions of all the images listed in the menu every time the button is pressed.

In an aspect of the present invention, a menu is displayed upon press of the button, the menu listing images representing all selectable set values in the order of being able to be selected by each press of the button, and a highlighted one of the images is changed by changing display positions of all the images listed in the menu every time the button is pressed.

Advantages

According to an aspect of the present invention, a user can intuitively understand all set values selectable as setting about shooting and an operation to select a desired set value.

REFERENCE NUMERALS 1 digital camera
21 LCD panel
22 toggle button
41 menu
83 video signal generating processor

BEST MODE FOR CARRYING OUT THE INVENTION

Hereinafter, an embodiment of the present invention is described with reference to the drawings.

Figure 1:
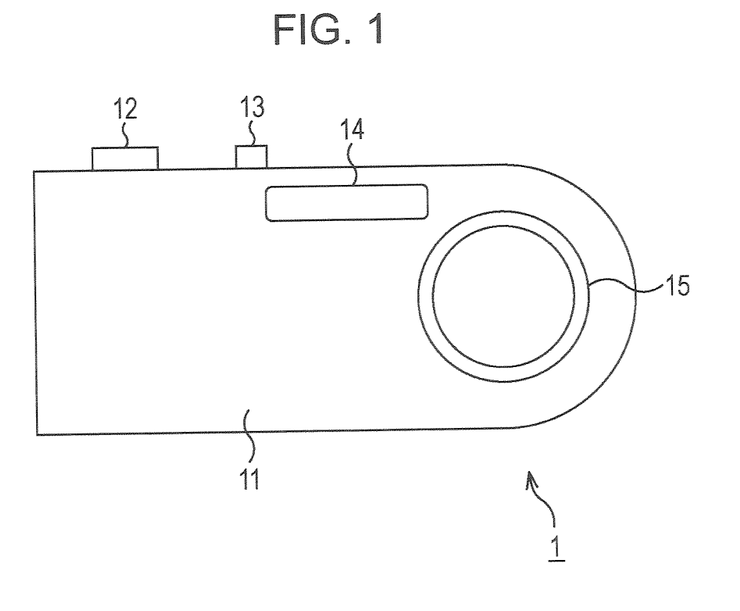
FIG. 1 illustrates an example of an outer configuration of a digital camera according to an embodiment of the present invention.
Figure 2:
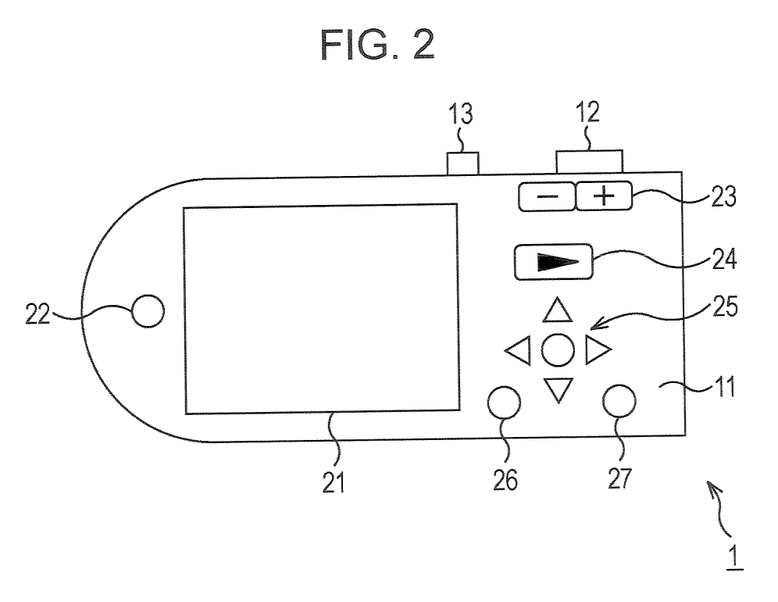
FIG. 2 illustrates an example of another outer configuration of the digital camera.

FIGS. 1 and 2 illustrate an example of an outer configuration of a digital camera 1 as an image capturing apparatus according to an embodiment of the present invention.

In FIGS. 1 and 2, parts corresponding to each other are denoted by the same reference numerals. Hereinafter, a case where the present invention is applied to the digital camera is described, but the present invention can be applied to various apparatuses having an image capturing function.

FIG. 1 illustrates a front appearance (the surface viewed from a subject) of the digital camera 1, and FIG. 2 illustrates a back appearance (the surface viewed from a photographer).

As illustrated in FIG. 1, on the upper surface of a main body 11 of the digital camera 1, a shutter button (release button) 12 is provided on the left viewed from a subject, and a power switch button 13 operated to switch ON/OFF the power is provided at substantially the center.

Also, a flash light emitting unit 14 is provided on the upper side of the front surface of the main body 11, and an image capturing lens 15 is provided on the right. The image capturing lens 15 provided in the digital camera 1 is a collapsible lens. When the power is ON through an operation of the power switch button 13 and when a shooting mode is selected, the image capturing lens 15 is protruded from the surface of the main body 11.

As illustrated in FIG. 2, a toggle button 22 operated to perform setting about shooting is provided on the left viewed from a photographer on the back surface of the main body 11 of the digital camera 1. As described below, by pressing the toggle button 22, a menu in which "macro mode" or "magnifying glass mode" can be selected as a closeup shooting mode is displayed on a liquid crystal display panel 21.

The liquid crystal display panel 21 (hereinafter referred to as LCD panel 21) is provided on the back surface of the main body 11 over its wide range. A captured image as well as the above-described menu is displayed on the LCD panel 21 in accordance with an operation by a user.

Buttons operated to perform various operations are provided on the right of the LCD panel 21. In the example illustrated in FIG. 2, the following buttons are provided from the top: a zoom button 23 ("−" zoom out and "+" zoom in) operated to adjust zoom/tele of an image capturing range; a captured image reproducing button 24 operated to reproduce a captured image; and a cursor indicating button 25 including up/down/right/left buttons operated to move a cursor displayed on the LCD panel 21 or change an image to be viewed and a set button operated to set an item. On the left and right of the cursor indicating button 25, a menu button 26 operated to display a menu screen on the LCD panel and an LCD panel display switch button 27 operated to switch display of the LCD panel 21 are provided. The menu screen displayed by press of the menu button 26 displays items that are selected to set a place where an image is to be recorded or to set the quality of the image to be recorded.

Figure 3:
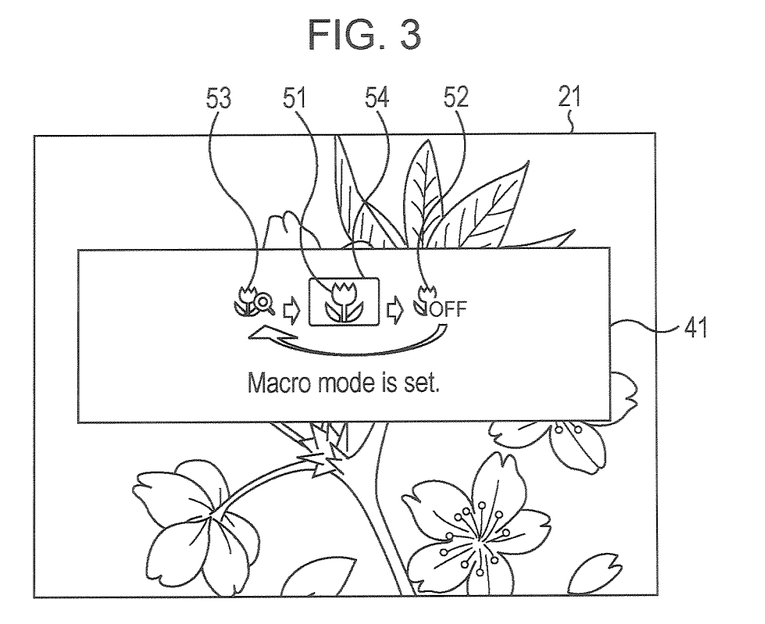
FIG. 3 illustrates an example of a screen displayed on an LCD panel.

FIG. 3 illustrates an example of a screen displayed on the LCD panel 21.

When the toggle button 22 is pressed only once, a menu 41 is displayed on the LCD panel 21 while being superimposed on an image captured at that time, as illustrated in FIG. 3. The menu 41 is different from the menu that is displayed on the LCD panel 21 upon press of the menu button 26 and is used to change the mode of closeup shooting.

In the example illustrated in FIG. 3, an image 51 representing the above-described "macro mode" (set value), which is one of the modes of closeup shooting; an image 52 representing OFF (set value) of the closeup shooting mode (image representing normal shooting); and an image 53 representing "magnifying glass mode" (set value) are displayed on the menu 41.

Herein, "macro mode" is a mode to shoot a subject that is too close to focus it by an autofocus function, and is set so that shooting is performed in a focusing range different from that of the autofocus function. For example, the focusing range of a normal autofocus function is 0.5 m to ∞, while the focusing range of the macro mode is about 0.08 m to ∞ at the wide end and is about 0.25 m to ∞ at the tele end, although the focusing range varies depending on the performance of lens components constituting the image capturing lens 15. The focusing range of the autofocus function is set as a range within which focusing can be performed in a short time after the shutter button is half-pressed by the user (after a shooting operation is started). When the macro mode is set, a subject close to the lens can be shot although focusing requires time.

"Magnifying glass mode" is a mode to shoot a subject that is closer than a subject to be shot by the macro mode. The focal length is fixed at the wide end, and setting is performed so that shooting is performed in a focusing range of about 0.01 m to 0.2 m.

The images 51 to 53 are displayed while being arranged in the order of being highlighted by each press of the toggle button 22. In the example illustrated in FIG. 3, the image 51 highlighted by being surrounded by a cursor 54 is displayed at the center, with the image 52 on the right and the image 53 on the left.

An outline arrow indicating the order of being highlighted by each press of the toggle button 22 is displayed between the respective images 51 to 53. A right-pointing arrow indicating that the image 52 is highlighted by pressing the toggle button 22 once in the present state where the image 51 is highlighted is displayed between the images 51 and 52.

A left-pointing arrow indicating that the image 53 is highlighted by pressing the toggle button 22 once in the state where the image 52 is highlighted, that is, indicating that the image 53 is highlighted by pressing the toggle button 22 twice in the present state where the image 51 is highlighted, is displayed between the images 52 and 53.

A right-pointing arrow indicating that the image 51 is highlighted by pressing the toggle button 22 once in the state where the image 53 is highlighted, that is, indicating that the image 51 is highlighted again by pressing the toggle button 22 three times in the present state where the image 51 is highlighted, is displayed between the images 53 and 51.

If the user presses the toggle button 22 once in the state where the images 51 to 53 are displayed, the image 51 is moved to the position where the image 53 is displayed in FIG. 3, and the image 52 is moved to the position where the image 51 is displayed in FIG. 3. Also, the image 53 is moved to the position where the image 52 is displayed in FIG. 3. That is, the display positions of all the images are dynamically changed based on the position of the highlighted image so that the highlighted image is positioned at the center of the images arranged.

Other than that the display positions of the images are changed, only the cursor 54 may be moved in accordance with a press of the toggle button 22, so that the highlighted image is changed.

As described above, the images representing all selectable set values (list of set values) are arranged and displayed by a press of the toggle button 22. Thus, the user can intuitively understand selectable set values at first view without pressing the toggle button 22 in succession, compared to a case where the menu 41 is not displayed and the images 51 to 53 are sequentially displayed one by one with every press of the button at a predetermined position of the LCD panel 21.

Since the arrows indicating the highlighted order (toggle order) are displayed between the images, the user can intuitively understand the number of presses of the toggle button 22 required to select a desired set value. For example, the user can intuitively understand that he/she can select OFF of the closeup shooting mode by pressing the toggle button 22 once in the state illustrated in FIG. 3 where "macro mode" is selected. Also, the user can understand that he/she can select "magnifying glass mode" by pressing the toggle button 22 twice.

Also, an explanation of the set value represented by the highlighted image is displayed on the menu 41 in the form of sentence. For example, when the image 51 is highlighted, a sentence "Macro mode can be set" is displayed. When the image 52 is highlighted, a sentence "Closeup shooting mode can be turned OFF" is displayed. When the image 53 is highlighted, a sentence "Magnifying glass mode can be set" is displayed. Detailed explanation of the set value may be displayed in the form of sentence, such as an effect that can be obtained by selecting the mode.

Such a sentence is not displayed while change of the display positions of the images 51 to 53 is performed by a press of the toggle button 22, but is displayed after a predetermined time period, e.g., two seconds, has elapsed from the timing when the toggle button 22 is last pressed. In a case where the sentence of the explanation of a newly selected set value is displayed just after the toggle button 22 is pressed, if the user presses the toggle button 22 in rapid succession, displayed sentences are changed one after another, and thus the display of the sentences flickers. Such a problem can be prevented.

As described above, an explanation of the set value represented by the highlighted image is displayed in the form of sentence, and thus the user need not remember the set values represented by the respective images displayed on the menu 41. It is often the case that the user does not know the set value represented by a displayed image, and this inconvenience can be prevented.

In the example illustrated in FIG. 3, a sentence "Macro mode is set" is displayed on the menu 41 as an explanation after a predetermined setting operation is performed in a state where the image 51 is selected. Setting of the set value may be performed by pressing the toggle button 22 twice in succession at a short time interval or by pressing the set button included in the cursor indicating button 25. Alternatively, the setting may be automatically performed without an operation by the user after predetermined time has elapsed after the toggle button 22 is last pressed in a state where a predetermined image is highlighted.

Upon setting of a predetermined set value, the menu 41 disappears and then the user can perform shooting at the set value. The menu 41 disappears also when the toggle button 22 is not pressed for a predetermined time period, e.g., five seconds, or when a button other than the toggle button 22 is pressed. In that case, a captured image or a screen according to the pressed button is displayed on the LCD panel 21.

Figure 4:
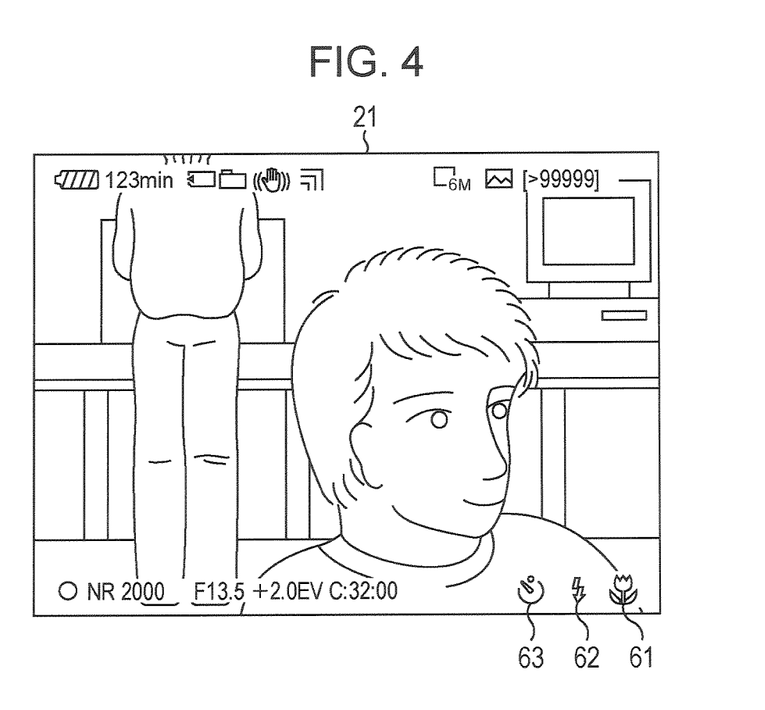
FIG. 4 illustrates an example of another screen displayed on the LCD panel.

FIG. 4 illustrates an example of a screen displayed on the LCD panel 21 when "macro mode" is selected from the menu 41 illustrated in FIG. 3.

In the example illustrated in FIG. 4, a captured image is displayed on the entire LCD panel 21. Also, images 61 to 63 are displayed on the lower right of the LCD panel 21. The image 61 represents that the macro mode is selected as the closeup shooting mode, and the image 62 represents a mode about flash used at shooting. The image 63 represents setting of a timer used at shooting. On the upper and lower sides of the LCD panel 21, images, characters, and numbers representing various settings about shooting are displayed along the edges of the LCD panel 21.

A process performed by the digital camera 1 to perform the above-described display is described below with reference to a flowchart.

Figure 5:
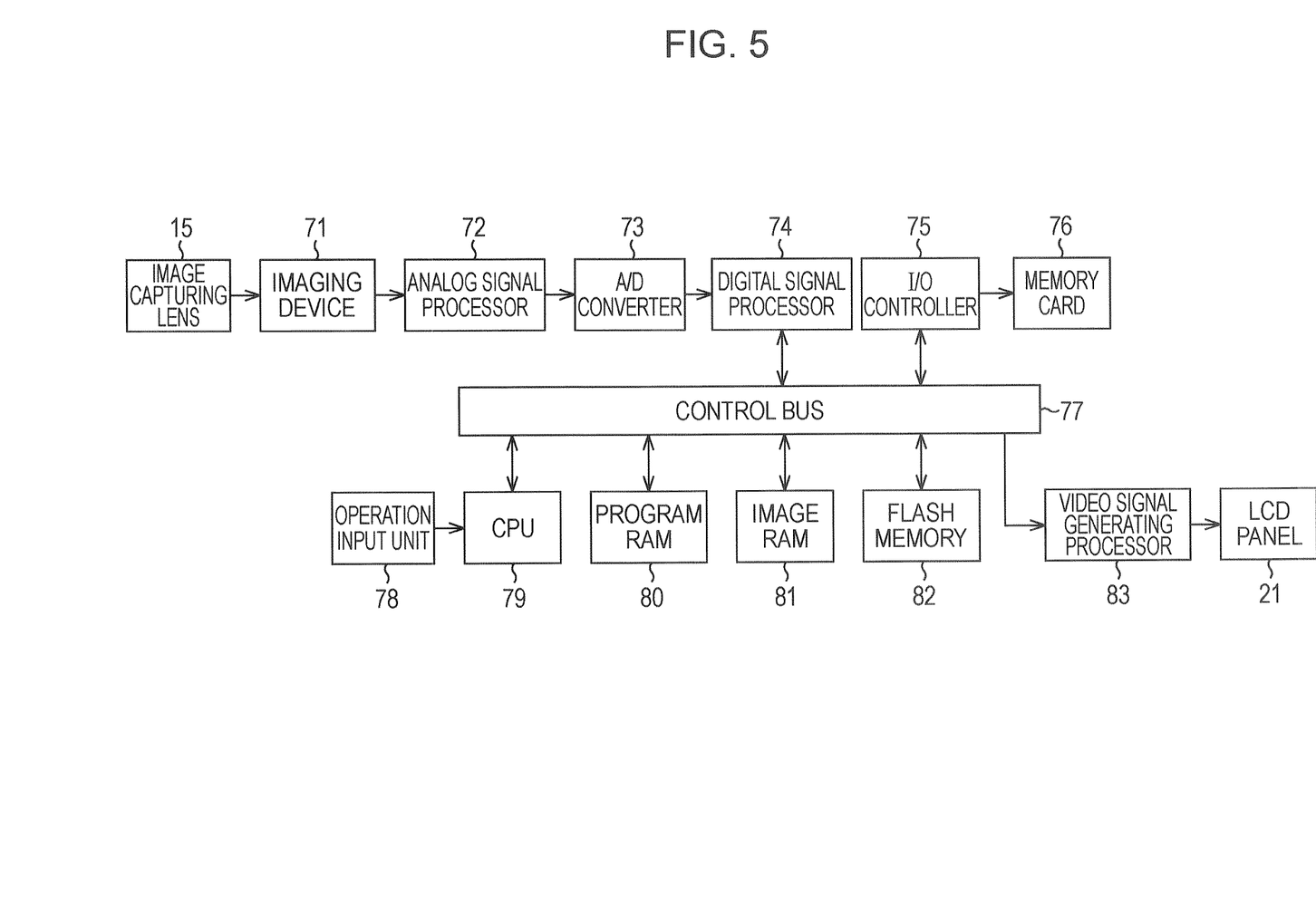
FIG. 5 is a block diagram of an example of an electrical configuration of the digital camera.

FIG. 5 is a block diagram of an example of an electrical configuration of the digital camera 1.

An imaging device 71, including a CCD (charge-coupled device), receives light from a subject entering through the image capturing lens 15, performs photoelectric conversion, and then outputs an analog image signal as an electric signal according to the amount of received light to an analog signal processor 72.

The analog signal processor 72 performs analog signal processing, such as amplification, gamma correction, and adjustment of a white balance, on the analog image signal supplied from the imaging device 71, and outputs an image signal obtained as a result of the analog signal processing to an A/D (analog to digital) converter 73.

The A/D converter 73 A/D converts the analog image signal supplied from the analog signal processor 72 and outputs digital image data obtained as a result of the A/D conversion to a digital signal processor 74.

The digital signal processor 74 performs digital signal processing, such as denoising, on the image data supplied from the A/D converter 73 in accordance with control by a CPU (central processing unit) 79 performed via a control bus 77. The digital signal processor 74 outputs data obtained by performing digital signal processing to a video signal generating processor 83 via the control bus 77 in order to display a captured image on the LCD panel 21.

When an image is to be recorded (when shooting instructions are provided from the user), the digital signal processor 74 compresses image data supplied from the A/D converter 73 in the JPEG (Joint Photographic Experts Group) method or the like and outputs the compressed image data obtained accordingly to an I/O controller 75 via the control bus 77 so as to record the compressed image data on a memory card 76.

When the image data is to be recorded, the I/O controller 75 records the data (compressed image data) supplied from the digital signal processor 74 via the control bus 77 on the memory card 76, which is inserted into a slot provided at a predetermined position of the main body 11. Also, the I/O controller 75 reads the data recorded on the memory card 76 and outputs the data to the control bus 77 in order to display an image based on the image data recorded on the memory card 76 or to transfer the image data to a personal computer or the like.

An operation input unit 78 detects a user operation performed on the various buttons provided on the main body 11 and outputs a signal corresponding to the user operation to the CPU 79. A user operation performed on the toggle button 22 is also detected by the operation input unit 78.

The CPU 79 expands a program recorded on a flash memory in a program RAM (random access memory) 80 and executes the program, so as to control each unit of the digital camera 1 and to perform various processes in accordance with signals from the operation input unit 78. The CPU 79 performs, for example, a shooting process including adjustment of an aperture for shooting, zooming of the image capturing lens 15, and control of exposure time, and control of display of the menu.

A program RAM 80 temporarily stores a program executed by the CPU 79 and data required by the CPU 79 to execute the program.

An image RAM 81 is used in a compressing process to record image data and a decompressing process to display an image based on compressed image data recorded on the memory card 76.

A flash memory 82 stores a program executed by the CPU 79 and data that needs to be held even after the power of the digital camera 1 is turned OFF, such as various information set in the digital camera 1.

The video signal generating processor 83 generates a video signal on the basis the compressed image data read from the memory card 76 by the I/O controller 75 and supplied via the control bus 77 or the image data captured by the image capturing lens 15 and supplied from the digital signal processor 74 via the control bus 77, and displays an image on the LCD panel 21 on the basis of the generated video signal. Also, the video signal generating processor switches display of the menu displayed on the LCD panel 21 in accordance with control by the CPU 79.

Figure 6:
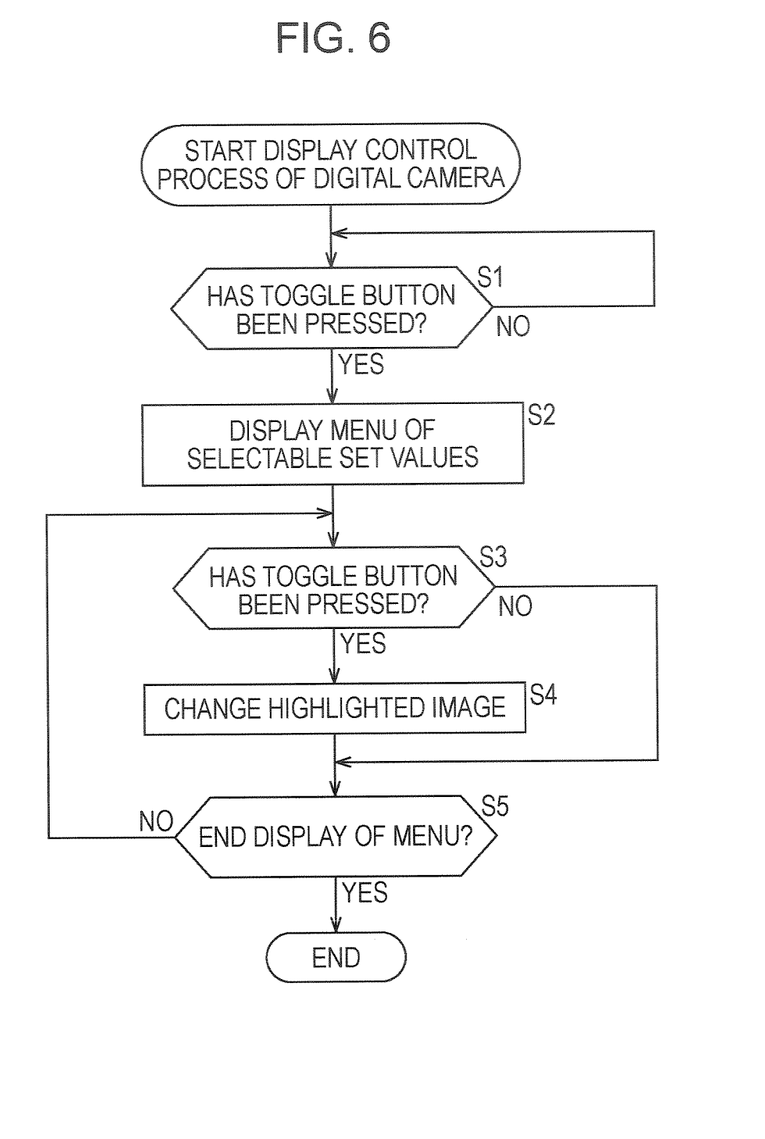
FIG. 6 is a flowchart illustrating a display control process performed by the digital camera.

Now, a process performed by the digital camera 1 to control the above-described display of a screen is described with reference to the flowchart illustrated in FIG. 6. This process starts after a shooting mode is selected and when a captured image is displayed on the LCD panel 21.

In step S1, the CPU 79 determines whether the toggle button 22 has been pressed by a user on the basis of a signal supplied from the operation input unit 78, and waits until the toggle button is pressed.

If the CPU 79 determines in step S1 that the toggle button 22 has been pressed, the process proceeds to step S2, where the CPU 79 displays the menu 41 illustrated in FIG. 3 including the images representing all selectable set values on the LCD panel 21 by controlling the video signal generating processor 83 via the control bus 77.

For example, the CPU 79 manages a table showing the correspondence between the states of the digital camera 1, such as shooting modes, and the set values selectable at the respective states. Information indicating the set values selectable in a state where the toggle button 22 is pressed is output from the CPU 79 to the video signal generating processor 83. In the video signal generating processor 83, a process of arranging and displaying the images representing the set values specified by the information supplied from the CPU 79 is performed. Accordingly, the menu 41 illustrated in FIG. 3 is displayed.

In step S3, the CPU 79 determines whether the toggle button 22 has been pressed. If the CPU 79 determines that the toggle button 22 has been pressed, the process proceeds to step S4.

In step S4, the CPU 79 changes the highlighted image by controlling the video signal generating processor 83 and changing the display positions of all the images displayed on the menu 41. Then, the process proceeds to step S5. If it is determined in step S3 that the toggle button 22 has not been pressed, step S4 is skipped and the process proceeds to step S5.

In step S5, the CPU 79 determines whether display of the menu 41 is to be ended. As described above, for example, when a predetermined set value is selected from among the set values whose images are displayed on the menu 41 or when a button other than the toggle button 22 is pressed, the CPU 79 determines that display of the menu 41 is to be ended.

If the CPU 79 determines in step S5 that display of the menu 41 is not to be ended, the process returns to step S3 and the subsequent steps are repeated. On the other hand, if the CPU 79 determines that display of the menu 41 is to be ended, the process ends.

With the above-described process, display of the menu 41 is controlled.

The display to set the closeup shooting mode has been described above, but the menu 41 may be used to perform other settings about shooting.

Figure 7:
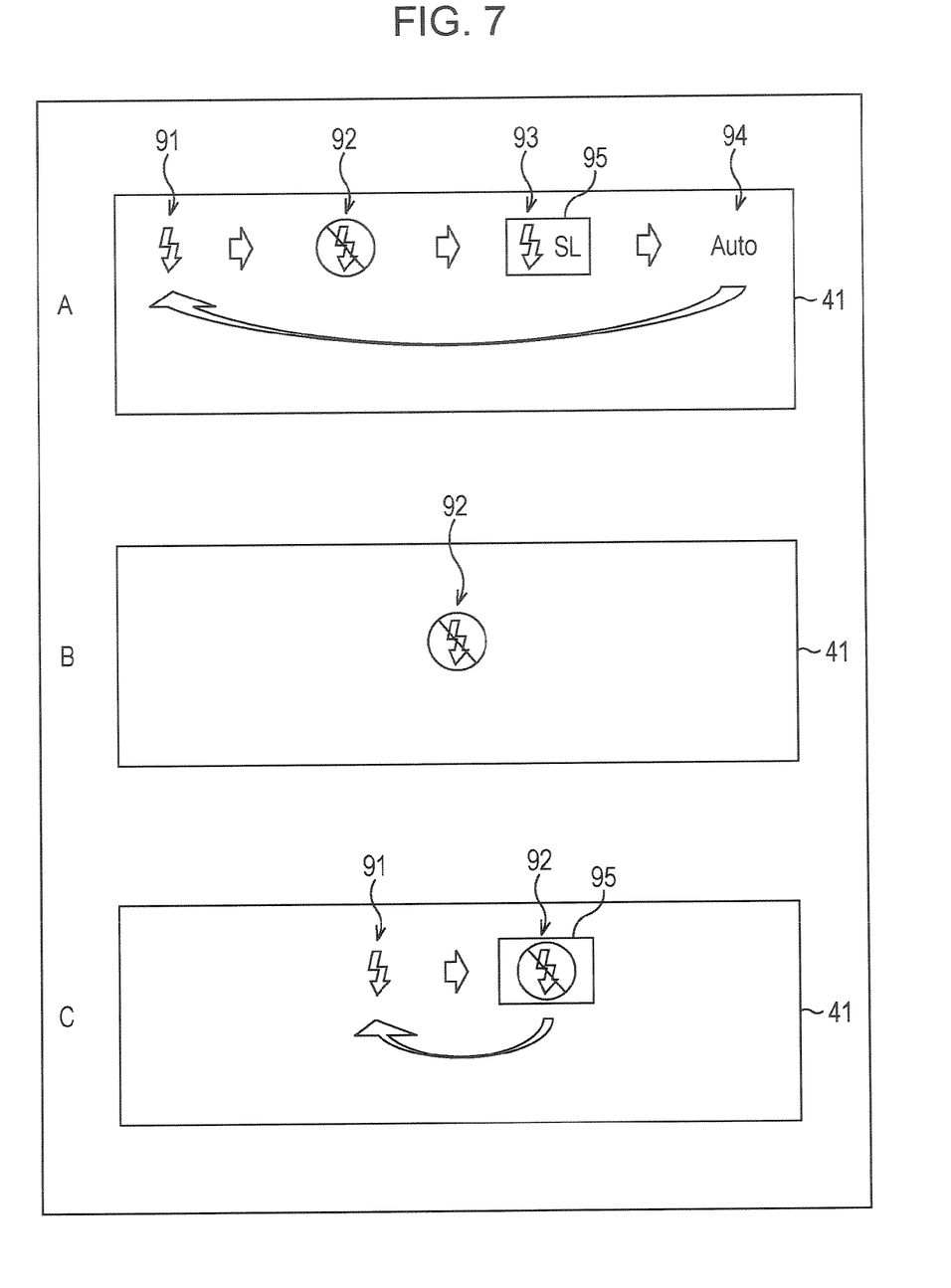
FIG. 7 illustrates display examples of a menu.
Figure 8:
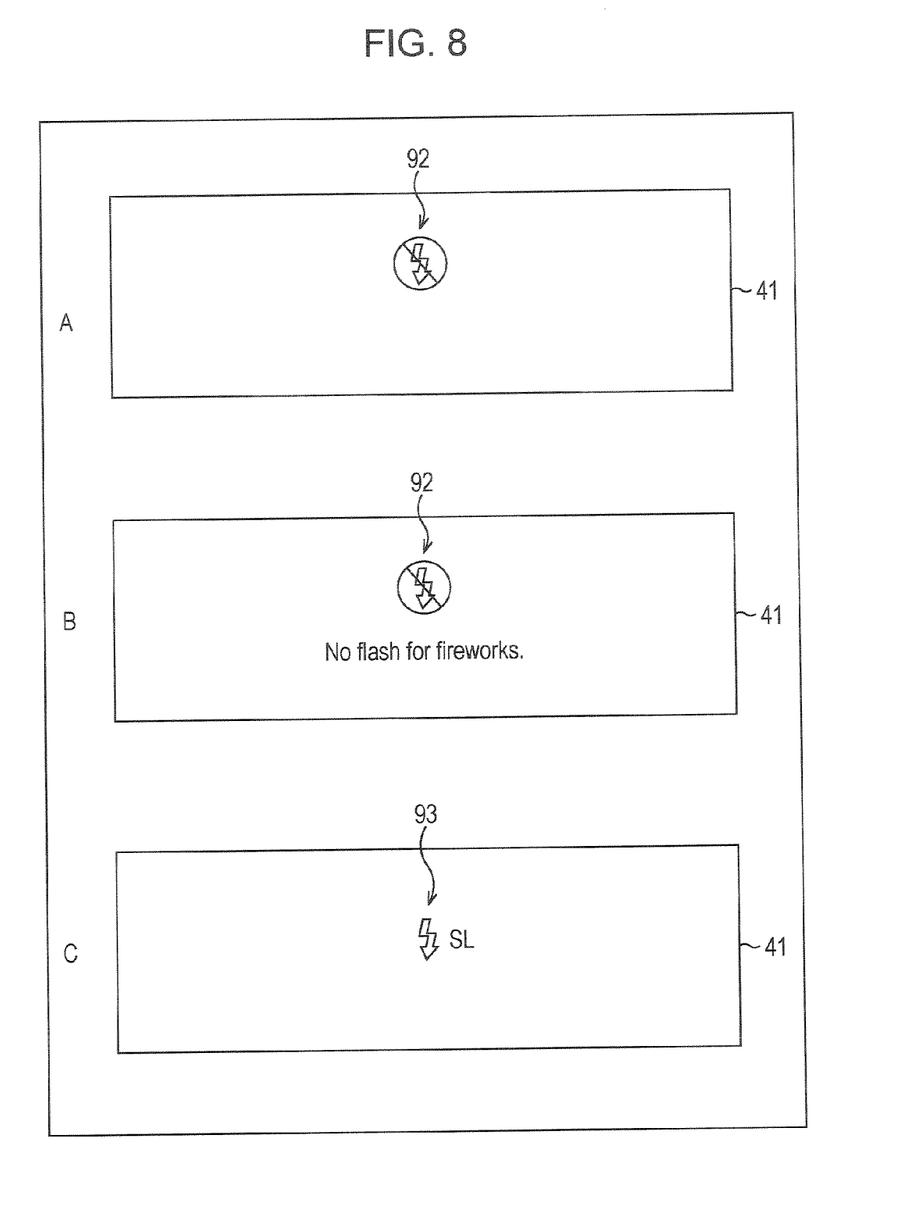
FIG. 8 illustrates other display examples of the menu.

A to C of FIG. 7 and A to C of FIG. 8 illustrate examples of display of the menu 41 used to set the flash.

The menu 41 illustrated in A to C of FIG. 7 and A to C of FIG. 8 is displayed upon press of a button provided in a hardware manner for setting the flash, as the toggle button 22. When the toggle button 22 is set as a button to set the flash, the menu 41 is displayed upon press of the toggle button 22. In this way, the function assigned to the toggle button 22 can be changed by the user.

Herein, assume that the function of the toggle button 22 is changed to serve as a button to set the flash.

The digital camera 1 is provided with four modes as flash set values, e.g., "forced flash mode", "no flash mode", "slow synchro mode", and "auto".

"Forced flash mode" is a mode to forcefully emit flash light in synchronization with the timing of shooting regardless of whether the amount of light is insufficient. "No flash mode" is a mode to forcefully prohibit emission of flash light regardless of whether the amount of light is insufficient. "Slow synchro mode" is a mode to perform shooting by emitting flash light while the shutter speed is set to relatively slow. "Auto" is a mode where flash light is emitted in synchronization with the timing of shooting if the digital camera 1 determines that the amount of measured light is insufficient and flash light is not emitted if the amount of light is sufficient.

In the digital camera 1, a predetermined set value among the four set values is selected as a selectable flash set value in accordance with the shooting mode selected by the user, and the image representing the set value is displayed on the menu 41. Thus, information of the set value displayed on the menu 41 is changed in accordance with the shooting mode selected by the user.

The shooting modes provided include "auto" in which the shutter speed and aperture are automatically set by the digital camera 1, "movie" that is set to perform movie shooting, "manual" in which the shutter speed and aperture are set by the user, and "scene selection".

"Scene selection" is selected to perform shooting with the aperture and shutter speed suitable for the condition of a subject. For example, "night scene", "fireworks", "night scene and person", and so on are provided in the digital camera 1.

"Night scene" is a mode to shoot a night scene without spoiling the atmosphere of darkness. For example, setting is made so that shooting is performed with a slow shutter speed in a state where emission of flash light is prohibited.

"Fireworks" is a mode to shoot fireworks in the sky. For example, setting is made so that shooting is performed with a focusing range of infinity, a relatively wide aperture, and a slow shutter speed in a state where emission of flash light is prohibited.

"Night scene and person" is a mode to shoot a person with a night scene on the background. For example, setting is made so that shooting is performed with a slow shutter speed in a state where flash light is forcefully emitted.

In FIG. 7, A illustrates an example of display of the menu 41 when "auto" is selected as the shooting mode.

When "auto" is selected as the shooting mode, an image 91 representing "forced flash mode" (set value), an image 92 representing "no flash mode" (set value), an image 93 representing "slow synchro mode" (set value), and an image 94 representing "auto" (set value) are displayed on the menu 41, which is displayed by a press of the toggle button 22, while being arranged in the order of being highlighted by each press of the toggle button 22. In the example illustrated in A of FIG. 7, the image 93 is highlighted by being surrounded by a cursor 95.

Every time the toggle button 22 is pressed by the user, the display positions of the images 91 to 94 are changed, and the highlighted image is changed accordingly.

For example, if the user presses the toggle button 22 once in the state of A of FIG. 7, the display position of the image 91 changes to the position where the image 94 is displayed in A of FIG. 7, and the display position of the image 92 changes to the position where the image 91 is displayed in A of FIG. 7. The display position of the image 93 changes to the position where the image 92 is displayed in A of FIG. 7, and the display position of the image 94 changes to the position where the image 93 is displayed in A of FIG. 7. That is, as in the menu 41 illustrated in FIG. 3, the display positions of all the images are changed in accordance with the position of the highlighted image, and thus the image 94 is highlighted.

With this display, the user can intuitively understand that, when "auto" is selected as the shooting mode, he/she can select a predetermined flash mode (set value) from among the four modes: "forced flash mode", "no flash mode", "slow synchro mode", and "auto" and can see all of the four modes at first view.

Also, the user can intuitively understand the number of presses of the toggle button 22 required to select the desired mode in the state illustrated in A of FIG. 7, where "slow synchro mode" is selected.

In FIG. 7, B illustrates an example of display of the menu 41 when "movie" is selected as the shooting mode.

When "movie" is selected as the shooting mode, "no flash mode" is set as the flash mode. As illustrated in B of FIG. 7, only the image 92 representing "no flash mode" is displayed on the menu 41, which is displayed by a press of the toggle button 22.

With this display, the user can understand that, when "movie" is selected as the shooting mode, he/she can select "no flash mode" as the flash mode, that is, he/she can select only "no flash mode".

In FIG. 7, C illustrates an example of display of the menu 41 when "manual" is selected as the shooting mode.

When "manual" is selected as the shooting mode, the image 91 representing "forced flash mode" and the image 92 representing "no flash mode" are displayed on the menu 41, which is displayed by a press of the toggle button 22, while being arranged in the order of being highlighted with each press of the toggle button 22. In C of FIG. 7, the image 92 is highlighted by being surrounded by the cursor 95.

Every time the toggle button 22 is pressed, the display positions of the images 91 and 92 are changed, and the highlighted image is changed accordingly.

For example, if the user presses the toggle button 22 once in the state illustrated in C of FIG. 7, the display position of the image 91 changes to the position where the image 92 is displayed in C of FIG. 7, and the display position of the image 92 changes to the position where the image 91 is displayed in C of FIG. 7.

With this display, the user can intuitively understand that, when "manual" is selected as the shooting mode, he/she can select a predetermined flash mode from among the two modes: "forced flash mode" and "no flash mode", and can see all of the two modes at first view.

Also, the user can intuitively understand the number of presses of the toggle button 22 required to select the desired mode in the state illustrated in C of FIG. 7, where "no flash mode" is selected.

In FIG. 8, A illustrates an example of display of the menu 41 when "scene selection" is selected as the shooting mode and "night scene" is selected therefrom.

When "scene selection" is selected as the shooting mode and when "night scene" is selected therefrom, "no flash mode" is set as the flash mode. As illustrated in A of FIG. 8, only the image 92 representing "no flash mode" is displayed on the menu 41, which is displayed by a press of the toggle button 22.

With this display, the user can understand that, when "scene selection" is selected as the shooting mode and when "night scene" is selected therefrom, he/she can select "no flash mode" as the flash mode, that is, he/she can select only "no flash mode".

In FIG. 8, B illustrates an example of display of the menu 41 when "scene selection" is selected as the shooting mode and when "fireworks" is selected therefrom.

When "scene selection" is selected as the shooting mode and when "fireworks" is selected therefrom, "no flash mode" is set as the flash mode. As illustrated in B of FIG. 8, only the image 92 representing "no flash mode" is displayed on the menu 41, which is displayed by press of the toggle button 22. Also, in B of FIG. 8, a sentence "No flash for fireworks" is displayed under the image 92.

With this display, the user can understand that, when "scene selection" is selected as the shooting mode and when "fireworks" is selected therefrom, he/she can select "no flash mode" as the flash mode, that is, he/she can select only "no flash mode".

Also, the user can understand the reason why only "no flash mode" can be selected from the sentence "No flash for fireworks". In this way, the explanation of a selectable mode may be displayed on the menu 41.

In FIG. 8, C illustrates an example of display of the menu 41 when "scene selection" is selected as the shooting mode and when "night scene and person" is selected therefrom.

When "scene selection" is selected as the shooting mode and when "night scene and person" is selected therefrom, "slow synchro mode" is set as the flash mode. As illustrated in C of FIG. 8, only the image 93 representing "slow synchro mode" is displayed on the menu 41, which is displayed by a press of the toggle button 22.

With this display, the user can understand that, when "scene selection" is selected as the shooting mode and when "night scene and person" is selected therefrom, he/she can select "slow synchro mode" as the flash mode, that is, he/she can select only "slow synchro mode".

In this way, the user may perform various settings about shooting, such as setting of ISO sensitivity and setting of exposure, in the menu 41 displayed by a press of the toggle button 22. For example, when ISO sensitivity is to be set, images representing the numbers indicating sensitivity are displayed on the menu 41 while being arranged in the order of being selected by each press of the button. When exposure is to be set, images representing the numbers indicating the amount of correction in + and − directions are displayed on the menu 41 while being arranged in the order of being selected by each press of the button.

The above-described series of processes may be executed by hardware or software. When the series of processes are executed by software, the program constituting the software is installed via a program recording medium from a computer incorporated in dedicated hardware or a multi-purpose personal computer that can perform various functions by being installed with various programs.

Figure 9:
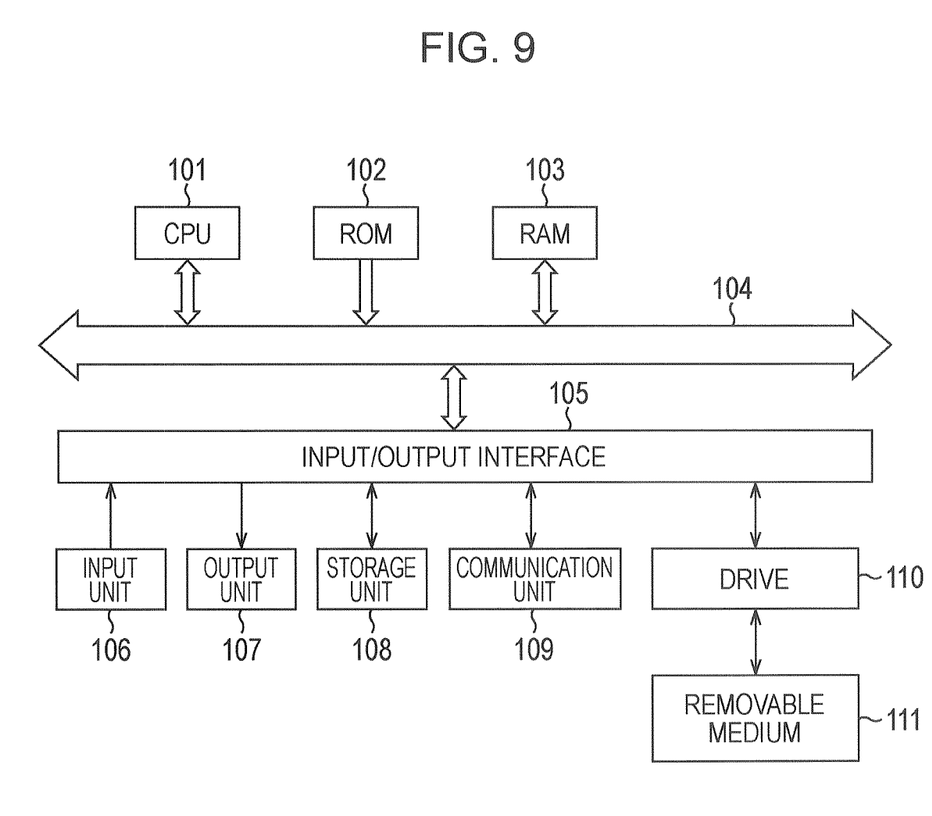
FIG. 9 is a block diagram of an example of a configuration of a personal computer.

FIG. 9 is a block diagram illustrating an example of a configuration of a personal computer executing the above-described series of processes in accordance with a program.

A CPU (central processing unit) 101 executes various processes in accordance with a program stored in a ROM (read only memory) 102 or a storage unit 108. A RAM (random access memory) 103 appropriately stores programs executed by the CPU 101 and data. The CPU 101, the ROM 102, and the RAM 103 are mutually connected via a bus 104.

The CPU 101 also connects to an input/output interface 105 via the bus 104. The input/output interface 105 connects to an input unit 106 including a keyboard, a mouse, and a microphone, and an output unit 107 including a display and a speaker. The CPU 101 executes various processes in response to commands input from the input unit 106. Then, the CPU 101 outputs results of the processes to the output unit 107.

The storage unit 108 connected to the input/output interface 105 includes a hard disk or the like and stores a program executed by the CPU 101 and various data. A communication unit 109 communicates with an external apparatus via a network, such as the Internet or a local area network.

When a removable medium 111, such as a magnetic disk, an optical disc, a magneto-optical disc, or a semiconductor memory, is loaded to a drive 110 connected to the input/output interface 105, the drive 110 drives the medium and obtains a program or data recorded thereon. The obtained program or data is transferred to the storage unit 108 as necessary and is stored therein.

The program recording medium to store a program that is installed to the computer and that is made executable by the computer includes the removable medium 111 illustrated in FIG. 9, which is a package medium including a magnetic disk (including a flexible disk), an optical disc (including a CD-ROM (compact disc read only memory) and a DVD (digital versatile disc)), a magneto-optical disk, or a semiconductor memory; the ROM 102 to temporarily or permanently store the program; and the hard disk serving as the storage unit 108. The program is stored in the program recording medium via the communication unit 109, which is an interface including a router or a modem by using a wired or wireless communication medium, such as a local area network, the Internet, or digital satellite broadcast, as necessary.

In this specification, the steps describing the program may be performed in time series in accordance with the described order. Alternatively, the steps may be performed in parallel or individually.

The invention claimed is:

1. An image capturing apparatus comprising:
   a user input, which when operated causes a menu to be displayed; and
   display control means for displaying the menu upon press of the user input, the menu listing images representing selectable functions assignable to the user input, and changing a function assigned to the user input by changing display positions of all the images listed in the menu every time the user input is pressed,
   wherein the display control means further displays an arrow between each of the images listed in the menu, each arrow indicating an order of being highlighted by each press of the user input,
   the display control means further displays an explanation of the set value represented by the highlighted image in the form of text on the menu, said text not being displayed while the highlighted image is displayed during the changing of the display positions occurs in response to plural successive operations of the user input, and said text not being displayed until after a predetermined time has elapsed from a last one of the plural successive operations of the user input so that flickering of the text is not displayed.

2. The image capturing apparatus according to claim 1, wherein the display control means further displays different images as images representing selectable set values on the menu in accordance with a mode selected by a user.

3. The image capturing apparatus according to claim 1, further comprising an image capturing lens.

4. The image capturing apparatus according to claim 1, wherein the user input is a button.

5. A display control method of an image capturing apparatus provided with a user input capable of changing setting about shooting, the display control method comprising:
   displaying a menu on a display screen in response to a press of the user input, the menu listing images representing selectable functions assignable to the user input, and changing a function assigned to the user input by changing display positions of all the images listed in the menu every time the user input is pressed;
   displaying, on the display screen, an arrow between each of the images listed in the menu, each arrow indicating an order of being highlighted by each press of the user input; and
   displaying an explanation of the set value represented by the highlighted image in the form of text on the menu, said text not being displayed while the highlighted image is displayed during the changing of the display positions occurs in response to plural successive operations of the user input, and said text not being displayed until after a predetermined time has elapsed from a last one of the plural successive operations of the user input so that flickering of the text is not displayed.

6. The display control method of claim 5, wherein the user input is a button.

7. A non-transitory computer readable storage medium encoded with instructions, which when executed by a computer causes the computer to execute a display control method of an image capturing apparatus provided with a user input capable of changing setting about shooting, the method comprising:
   displaying a menu on a display screen in response to a press of the user input, the menu listing images representing selectable functions assignable to the user input, and changing a function assigned to the user input by changing display positions of all the images listed in the menu every time the user input is pressed;
   displaying, on the display screen, an arrow between each of the images listed in the menu, each arrow indicating an order of being highlighted by each press of the user input; and
   displaying an explanation of the set value represented by the highlighted image in the form of text on the menu, said text not being displayed while the highlighted image is displayed during the changing of the display positions occurs in response to plural successive operations of the user input, and said text not being displayed until after a predetermined time has elapsed from a last one of the plural successive operations of the user input so that flickering of the text is not displayed.

8. The non-transitory computer readable storage medium according to claim 7, wherein the user input is a button.

9. An image capturing apparatus comprising:
   a user input, which when operated causes a menu to be displayed; and a display controller that displays the menu upon press of the user input, the menu listing images representing selectable functions assignable to the user input, and changing a function assigned to the user input by changing display positions of all the images listed in the menu every time the user input is pressed, wherein the display controller further displays an arrow between each of the images listed in the menu, each arrow indicating an order of being highlighted by each press of the user input, and the display controller further displays an explanation of the set value represented by the highlighted image in the form of text on the menu, said text not being displayed while the highlighted image is displayed during the changing of the display positions occurs in response to plural successive operations of the user input and said text not being displayed until after a predetermined time has elapsed from a last one of the plural successive operations of the user input so that flickering of the text is not displayed.

10. The image capturing apparatus according to claim 9, further comprising an image capturing lens.

11. The image capturing apparatus according to claim 9, wherein the user input is a button.

\* \* \* \* \*